UNITED STATES PATENT OFFICE.

THOMAS EDWARD CONWAY, OF GALENA, KANSAS.

COATING COMPOUND.

1,020,801.　　Specification of Letters Patent.　Patented Mar. 19, 1912.

No Drawing.　Application filed August 3, 1910. Serial No. 575,376.

*To all whom it may concern:*

Be it known that I, THOMAS E. CONWAY, a citizen of the United States, residing at Galena, in the county of Cherokee and State of Kansas, have invented new and useful Improvements in Coating Compounds, of which the following is a specification.

The invention relates to a composition of matter, and more particularly to an improved coating compound.

The prime function of the invention is to protect conduits, mains, pipes, and other like leads used in conveying gas or other fluid for preservation against the action of acid and alkaline properties present in the fluid when flowing through the same, thereby increasing the life of such conduits, pipes or the like.

A further function of the invention is the provision of a coating compound of the character described which will impregnate the pores of a conduit, pipe or the like, which is subjected to electric currents so that the same is rendered impervious to all kinds of acid properties or alkaline waters, thus obviating electrolysis, rust or crumbling away of such conduit, pipe or the like when in use.

The composition consists of the following ingredients, combined in the proportions stated, viz:

| | |
|---|---|
| Iron sesquioxid | 2.57%. |
| Lead carbonate | 10.74%. |
| Zinc oxid | 8.36%. |
| Copper oxid | 8.12%. |
| Pitch | 70.21%. |

These ingredients are to be thoroughly mingled by agitation and subjected to a carefully regulated heat, preferably of a predetermined Fahrenheit temperature. Also the article to which the compound thus treated is to be applied is subjected to a predetermined temperature of heat, prior to the application of the said compound. It will be herein stated that this compound differs from a paint composition, because it is an impossibility to apply the same to wood material. Furthermore, it differs in that the article and also the compound have to be subjected to heat prior to the application of the composition of matter on the said article. The composition when applied to the article to be coated, will penetrate the pores thereof so as to make the said article impervious to water, and also making it proof against all kinds of alkaline waters, rust and electrolysis.

It is, of course, to be understood that in the application of the composition, the latter must be applied immediately when the same has been heated to a predetermined temperature and likewise the article to be coated therewith.

What is claimed is:

The herein-described composition of matter for coating and filling the pores of conduits, pipes, mains or the like, consisting of iron sesquioxid 2.57%; lead carbonate 10.74%; zinc oxid 8.36%; copper oxid 8.12%; and ordinary commercial pitch 70.21%, forming a water, acid and alkali-proof, electric-insulating compound thick and incapable of being spread at normal temperature, adapted to be thinned at high temperature and of a consistence and degree of refractability requiring both it and the article to be heated in the coating process, substantially as described.

In testimony whereof I affix my signature in presence of two witnesses.

THOMAS EDWARD CONWAY.

Witnesses:
　M. L. ROBESON,
　LYTLE H. MOORE.